(12) United States Patent
Nishikawa

(10) Patent No.: US 7,561,314 B2
(45) Date of Patent: Jul. 14, 2009

(54) DOCUMENT READER AND IMAGE FORMING APPARATUS CAPABLE OF REDUCING LINE-SHAPED NOISE

(75) Inventor: Hiroshi Nishikawa, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 893 days.

(21) Appl. No.: 11/009,052

(22) Filed: Dec. 13, 2004

(65) Prior Publication Data

US 2006/0050332 A1    Mar. 9, 2006

(30) Foreign Application Priority Data

Sep. 8, 2004    (JP)    ............... 2004-261143

(51) Int. Cl.
*H04N 1/04*    (2006.01)
(52) U.S. Cl. ................. 358/496; 358/486; 358/498; 358/406
(58) Field of Classification Search .................. 358/496, 358/486, 498, 406, 474, 504
See application file for complete search history.

(56) References Cited

U.S. PATENT DOCUMENTS 7,212,320 B2    5/2007    Imoto 7,317,561 B2 *    1/2008    Makino et al. ............... 358/496

FOREIGN PATENT DOCUMENTS

| JP | 2000-324312 | 11/2000 |
|---|---|---|
| JP | 2001-272829 | 10/2001 |
| JP | 2002-290666 | 10/2002 |
| JP | 2002-290667 | 10/2002 |
| JP | 2004-112611 | 4/2004 |

OTHER PUBLICATIONS

Japanese Office Action, mailed on Nov. 20, 2007, directed to corresponding Japanese Application No. 2004-261143. 24 pages.

* cited by examiner

*Primary Examiner*—Houshang Safaipour
(74) *Attorney, Agent, or Firm*—Morrison & Foerster LLP

(57) ABSTRACT

A document reading unit constituting an MFP reciprocates a reading glass holder in a direction of a vertical scanning at a low frequency (18 times per second) with use of a crank mechanism including a motor and gears. A stroke length of the reciprocating motion of a reading glass is 9 mm. This structure can make a line-shaped noise less noticeable, because a length of each portion of a line-shaped noise becomes 2.57 mm and a distance between adjacent portions of the line-shaped noise becomes 7.27 mm when a foreign object having a diameter of 100 μm adheres to the reading glass.

14 Claims, 13 Drawing Sheets

DOCUMENT READER AND IMAGE FORMING APPARATUS CAPABLE OF REDUCING LINE-SHAPED NOISE

CROSS REFERENCE TO RELATED APPLICATIONS

This application is based on application NO. 2004-261143 filed in Japan, the contents of which are hereby incorporated by reference.

BACKGROUND OF THE INVENTION (1) Field of the Invention

The present invention relates to a sheet-through type document reader and an image forming apparatus including the same, and in particular to a technique for reducing a line-shaped noise caused by a foreign object adherent to a reading glass.

(2) Description of the Related Art

Sheet-through type document readers read images while feeding a document onto a scanner. Compared to platen-set type document readers, which read images by a scanner moving along the document, the sheet-through type document readers have the advantages, such as their small sizes, low costs, low undesired sound, and high productivities. Therefore, the sheet-through types are in the mainstream of document reading devices.

In such a sheet-through type document reader, a roller, a guide member or the like rub against documents during the feeding. This frequently produces foreign objects, such as paper dusts. When such foreign objects are adherent to the reading glass, noises in shapes of lines (line-shaped noises) often occur on read images.

To solve this problem, for instance, a technique for vibrating optical parts including a reading glass at a frequency equal to or more than 5 kHz has developed (see Japanese Unexamined Patent Publication NO. 2000-324312). FIG. 1 schematically shows a structure of a document reader pertaining to such a conventional technology. As FIG. 1 shows, a document reader 60 pertaining to the conventional technology feeds a document 603 using rollers 601 and 602, leads the document 603 to an image reading position using guide members 604 and 605. The document 603 pressed against the reading glass 608 by a backup member 607 is illuminated by an exposure lamp 609, its reflected light enters into a CCD (Charge Coupled Device) 612 via a mirror 610 and a lens 611, and thereby the image of the document 603 is read.

The reading glass 608 is supported by a device frame 613 with elastic members 614, and reciprocates in the direction of the vertical scanning, being driven by a driving device 615. The reciprocation cycle of the reading glass 608 is substantially the same as the reading cycle of the CCD 612. By this operation, foreign objects on the reading glass 608 are removed from a reading area of the CCD 612 in the reading cycle, and the line-shaped noise becomes faint and less noticeable.

However, this document reader makes an undesired sound when vibrating at such a high frequency, and therefore it is not suitable for office use.

Also, color readers, which have been enthusiastically developed in recent years, need CCDs for each primary color of RGB. Therefore, a reading area of a color reader is larger than that of a monochrome reader. This makes it difficult to remove foreign objects from the reading area, compared to the case of the monochrome reader.

Further, the line-shaped noise is more noticeable when a color reader is used than when the monochrome reader is used. FIG. 2 is a graph showing a gamma curve used for gamma correction. In FIG. 2, the horizontal axis represents an input density, and the vertical axis represents an output density. The solid line represents a gamma curve used for a color reader (this curve is hereinafter called the "color gamma curve"), and the broken line represents a gamma curve used for a monochrome reader (this curve is hereinafter called the "monochrome gamma curve").

As FIG. 2 shows, the inclination of the monochrome gamma curve is steep while the input density is an intermediate density, and the inclination is gentle while the input density is low or high. This characteristic produces the effect of making a read image clear by lowering the density of the background image and heightening the density of the character image. The density of a line-shaped noise caused by a foreign object, such as a paper dust, is already low, but becomes even lower by the gamma correction. Also, the gradation reproducibility is low when the density is high. When images around a line-shaped noise at high density are at high density as well, the line-shaped noise is concealed by the images and becomes less noticeable.

On the contrary, regarding the color gamma curve, the lowering of the gradation reproducibility does not depend on the input density very much. Compared to the case of the monochrome reader, the line-shaped noise is more noticeable in the case of the color reader regardless of the density of the line-shaped noise.

Also, when the foreign object moves across the reading area of the CCD 612, it means that the object moves across CCDs corresponding to colors of RGB respectively. Accordingly, the color of the line-shaped noise changes along the direction of the vertical scanning. When this happens, the line-shaped noise is hardly concealed by the images.

SUMMARY OF THE INVENTION

The object of the present invention is therefore to provide a document reader and an image forming apparatus capable of reducing a line-shaped noise caused by a foreign object on a reading glass, without vibrating the reading glass at a high frequency when reading a color image.

The above object is fulfilled by a document reader that reads a color image of a document via a transparent member while feeding the document, comprising: a plurality of reading units disposed in a feeding direction of the document; and a driving unit operable to reciprocate the transparent member in the feeding direction over the reading units, wherein a stroke length of the reciprocating motion of the transparent member is longer than a width in the feeding direction of a reading area of the reading units.

This enables the document reader to reduce a line-shaped noise caused by a foreign object on a reading glass without vibrating the reading glass at high frequency when reading a color image.

Note that in this specification, "the width of the reading area" means the distance between first and last reading positions of the reading units. The reading positions are disposed in the feeding direction on the reading glass. The width of the reading area includes line widths of the reading positions where the reading units read. For instance, when the line width of each reading unit is 1 dot and the width of the reading area is 9 dots, the first 1 dot and the last 1 dot out of 9 dots are line widths of the reading positions.

When the width of the reading area is W and the stroke length is S, $$\frac{W}{S} \le 0.9.$$

This enables the document reader to make the line-shaped noise less noticeable when the reflection density of a foreign object adherent to the transparent member is low.

Also, when the width of the reading area is W and the stroke length is S, $$\frac{W}{S} \le 0.3$$

may be satisfied.

This structure is more preferable because the document reader can make the line-shaped noise less noticeable regardless of the reflection density of a foreign object adherent to the transparent member.

A velocity of the reciprocating motion may vary according to a sine wave.

This enables the document reader to reduce undesired vibrations and sounds caused by reciprocating the transparent member.

Also, when a linear reading velocity of each reading unit is V, the width of the reading area is W, a frequency of of a foreign object adherent to the transparent member is d, and the stroke length of the reciprocating motion is S, $$S \ge \frac{(V(W+d))^2}{9f^2 W}, \quad \text{and} \quad S \ge \left(\frac{1}{1-\frac{7f}{V}} \times \frac{\sqrt{W}}{W+d}\right)^2.$$

This structure can make a line-shaped noise less noticeable, because a cycle of the line-shaped noise becomes not less than 7 mm and a length of each portion of the line-shaped noise becomes not more than 3 mm.

Note that the width of the foreign object adherent to the reading glass is so small compared to the width of the reading unit that the width of the foreign object can be disregarded. Therefore, the same effect can be gained by the document reader satisfying a condition that when a linear reading velocity of each reading unit is V, the width of the reading area is W, a frequency of the reciprocating motion is f, and the stroke length of the reciprocating motion is S, $$S \ge \frac{V^2 W}{9f^2}, \quad \text{and} \quad S \ge \left(\frac{1}{1-\frac{7f}{V}} \times \frac{1}{\sqrt{W}}\right)^2.$$

For instance, a document reader is capable of making the line-shaped noise less noticeable when a linear reading velocity of each reading unit is 177 mm/s, the width of the reading area is 387 µm, a frequency of the reciprocating motion is 18 Hz, and the stroke length is 9 mm.

Also, the reading units may be three CCD line sensors, which are disposed so that longitudinal directions of the CCD are substantially orthogonal to the feeding direction With this structure, a document reader using a CCD line sensor can make the line-shaped noise less noticeable.

An image forming apparatus according to the present invention comprises a document reader including: a feeding unit operable to feed a document; a transparent member; a plurality of reading units disposed in a feeding direction of the document and operable to read a color image of the document via the transparent member; and a driving unit operable to reciprocate the transparent member in the feeding direction over the reading units, wherein a stroke length of the reciprocating motion of the transparent member is longer than a width in the feeding direction of a reading area of the reading units. With this structure, the image forming apparatus can reduce a line-shaped noise caused by a foreign object adherent to the read glass without vibrating the reading glass at a high frequency when reading a color image.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 7A shows a case where a reading glass is not moved, FIG. 7B shows a case where the reading glass is moved only in one direction, and FIGS. 7C and 7D shows cases where the reading glass is reciprocated at 10 Hz and 50 Hz respectively;

DESCRIPTION OF THE PREFERRED EMBODIMENT

The following describes an embodiment of a document reader and an imaging forming apparatus pertaining to the present embodiment with reference to figures by taking an MFP (Multi-Functional peripheral) as an example.

1. Structure of Apparatus

Figure 1:
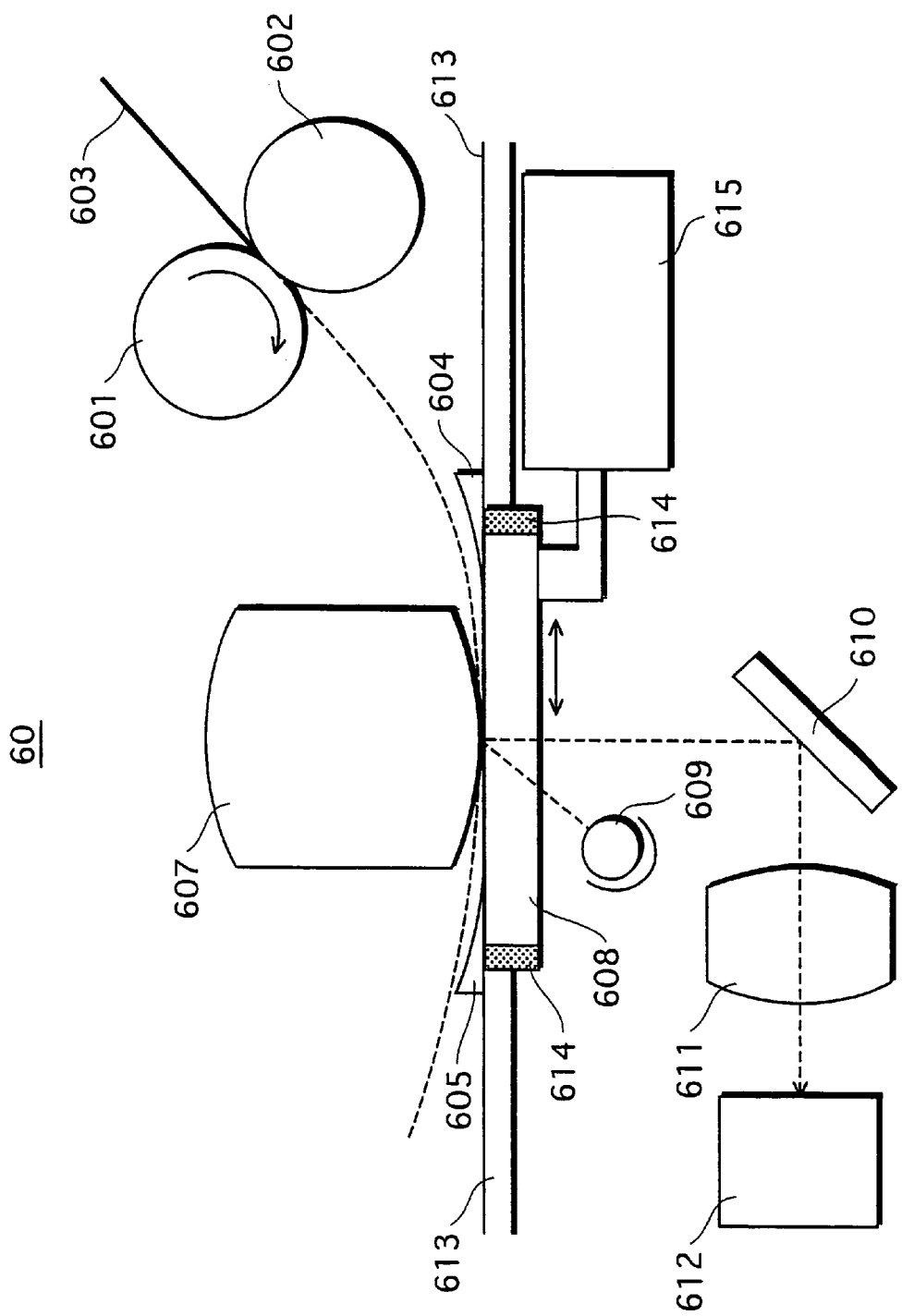
FIG. 1 schematically shows a structure of a document reader pertaining to a conventional technology.
Figure 2:
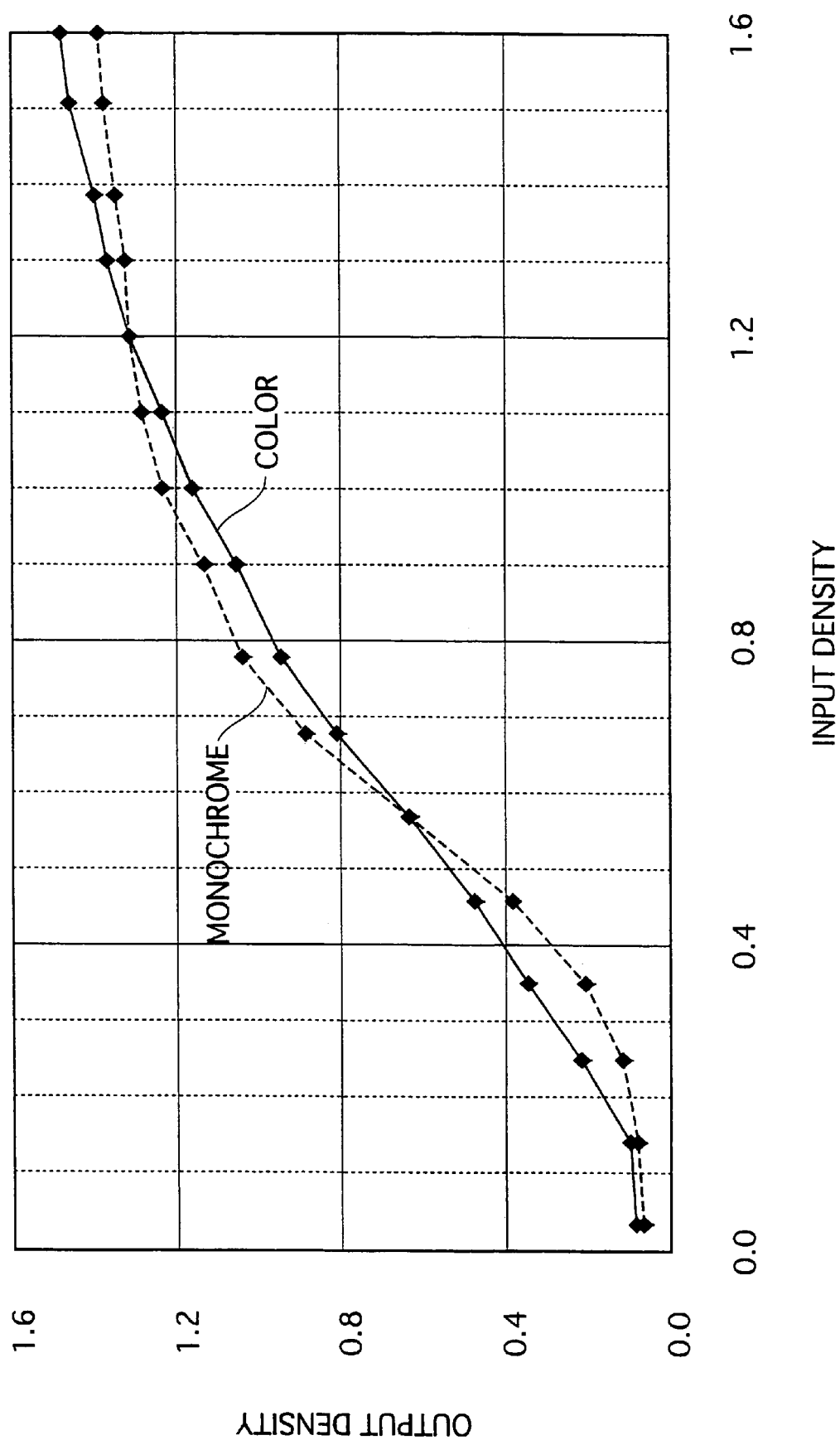
FIG. 2 is an example graph showing gamma curves used for gamma correction of a monochrome image and a color image.
Figure 3:
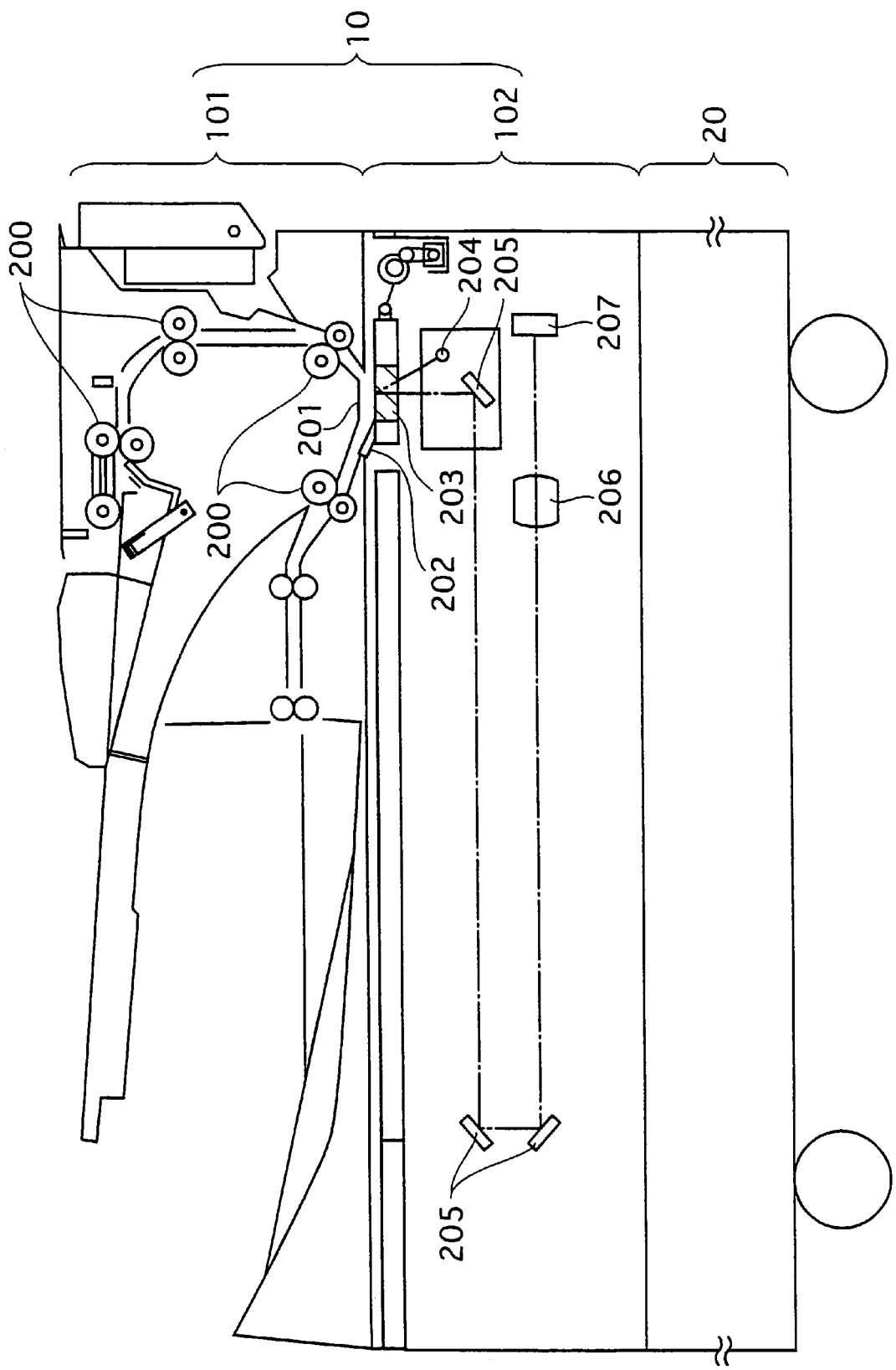
FIG. 3 is a perspective view that schematically shows a structure of an MFP pertaining to an embodiment of the present invention.

FIG. 3 schematically shows a structure of an MFP pertaining to the embodiment of the present invention. As FIG. 3 shows, the MFP 1 includes a document reader 10 and an image forming apparatus 20. The document reader includes an ADF (Automatic Document Feeder) 101 and a document reading unit 102. The structure of the image forming apparatus 20 is not described here.

The ADF 101 includes feeding rollers 200 for feeding documents and an upper regulator 201. The document reading unit 102 includes a reading glass 203, an exposure lamp 204, a reflecting mirror 205, a paper guide 202, a lens 206, a CCD 207, and an image processing unit (not shown in the figure).

With this structure, a document is fed onto the reading glass 203 by the feeding rollers 200, and pressed against the reading glass 203 by the upper regulator 201. When the exposure lamp 204 illuminates the surface of the document, the light reflected from the document enters into the CCD 207 via the reflecting mirror 205 and the lens 206. An electrical signal output by the CCD 207 enters into the image processing unit for performing image processing, such as gamma correction.

Note that the CCD 207 is a color CCD with 600 dpi, 177 mm/s as a linear reading velocity, and 9 dots (=387 μm) as a reading width.

2. Driving of Reading Glass

Figure 4:
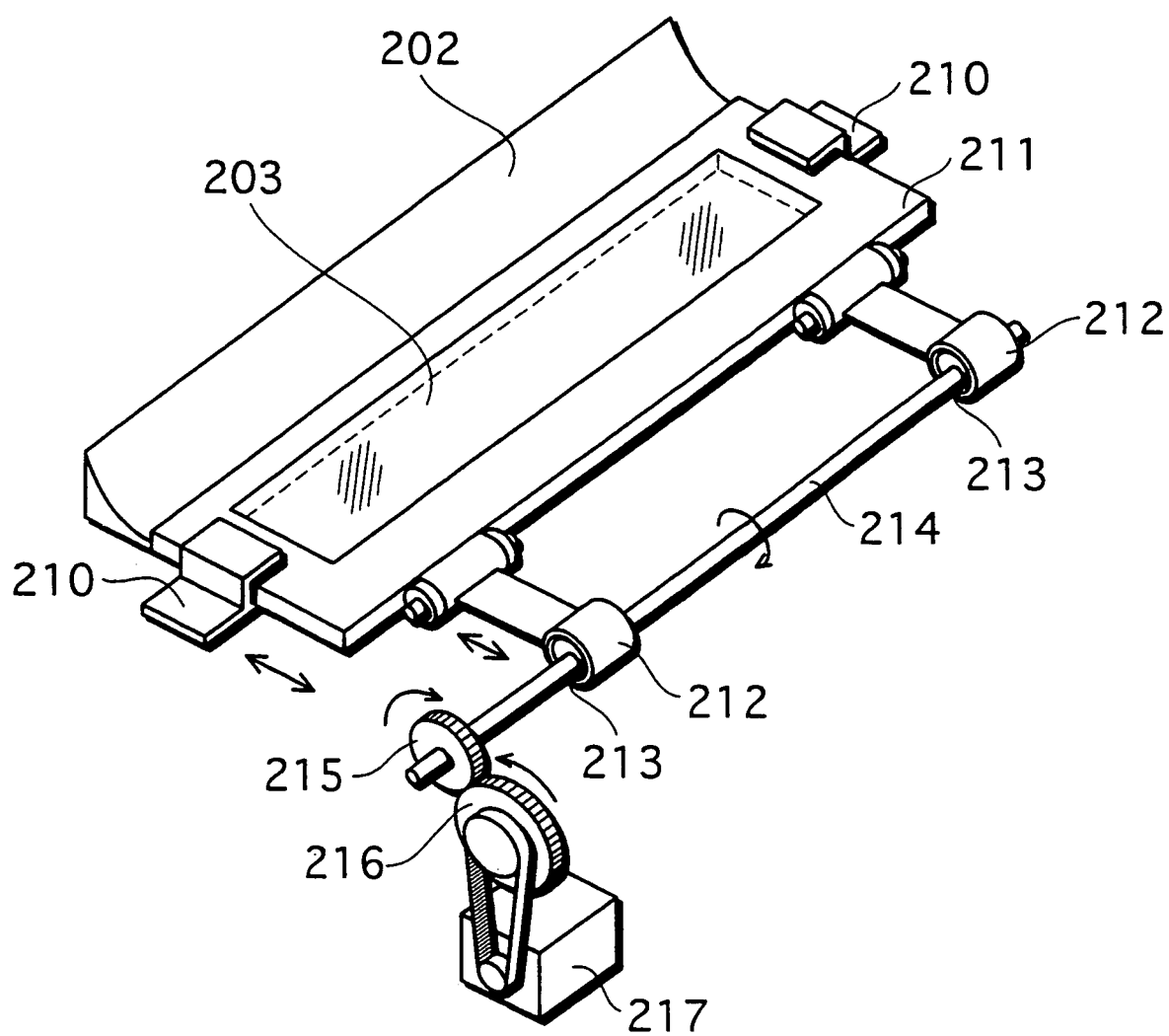
FIG. 4 shows a structure of a document reading unit 102 for reciprocating a reading glass 203.

The MFP 1 reciprocates the reading glass 203 by a crank mechanism. FIG. 4 shows a structure of the document reading unit 102 for reciprocating the reading glass 203. As FIG. 4 shows, the document reading unit 102 includes the paper guide 202, the reading glass 203, a glass holder guide 210, a reading glass holder 211, an arm 212, a cam 213, a shaft 214, gears 215 and 216, and a motor 217.

The reading glass 203 is supported by the reading glass holder 211, and the reading glass holder 211 is regulated by the glass holder guide 210 so as to reciprocate in the direction of the vertical scanning. Also, the arm 212, which is rotatable, is attached to the reading glass holder 211. One end of the arm 212, which is the end not connected to the reading glass holder 211, is a cam follower.

The cam 213 is freely fit to the cam follower of the arm 212. The gear 215 is attached to one end of the shaft 214 that drives the cam 213 rotatively. The gear 216 meshes with the gear 215, and has a band wheel using the same axis as the gear 216. The motor 217 has a band wheel as well, and a band is attached around the band wheels of the motor 217 and the gear 216. As the motor 217 rotates its band wheel, the band wheel of the gear 216 is driven rotatively. This rotates the gear 216, and then rotates the gear 215. The cam 213 and the arm 212 convert this rotary motion to a linear motion, and accordingly the reading glass holder 211 reciprocates in the direction of the vertical scanning.

By the above-described crank mechanism, the reading glass 203 reciprocates 18 times per second in the embodiment. The stroke length of the reciprocating motion $L_{STROKE}$ is 9 mm.

Figure 5:
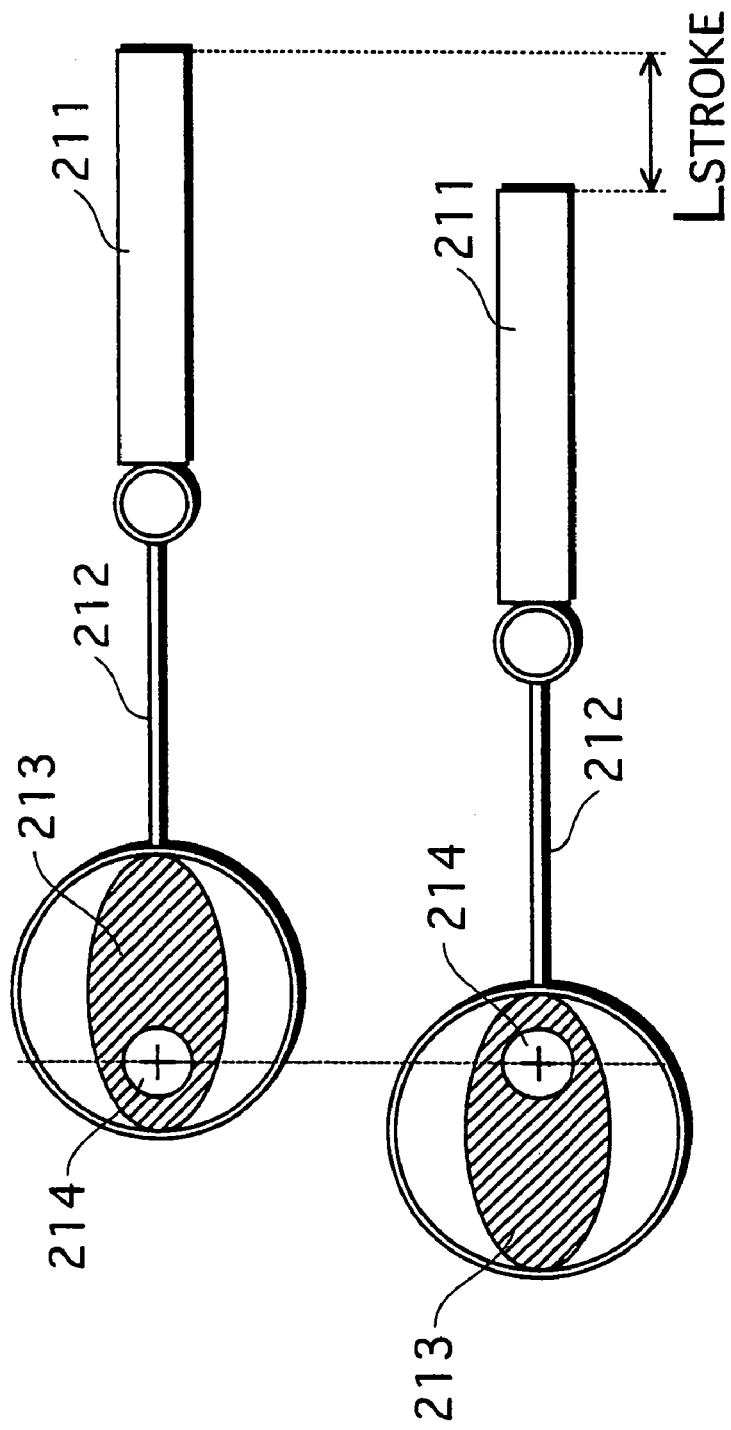
FIG. 5 schematically shows a stroke of a reciprocating motion of a reading-glass 203.

FIG. 5 schematically shows the stroke of the reciprocating motion of the reading glass 203. As FIG. 5 shows, $L_{STROKE}$ represents the distance between the position of the reading glass holder 211 at a time when the cam 213 is most distant from the reading glass holder 211, and the position of the reading glass holder 211 at a time when the cam 213 is closest to the reading glass holder 211.

3. Evaluation of Line-Shaped Noise

Figure 6:
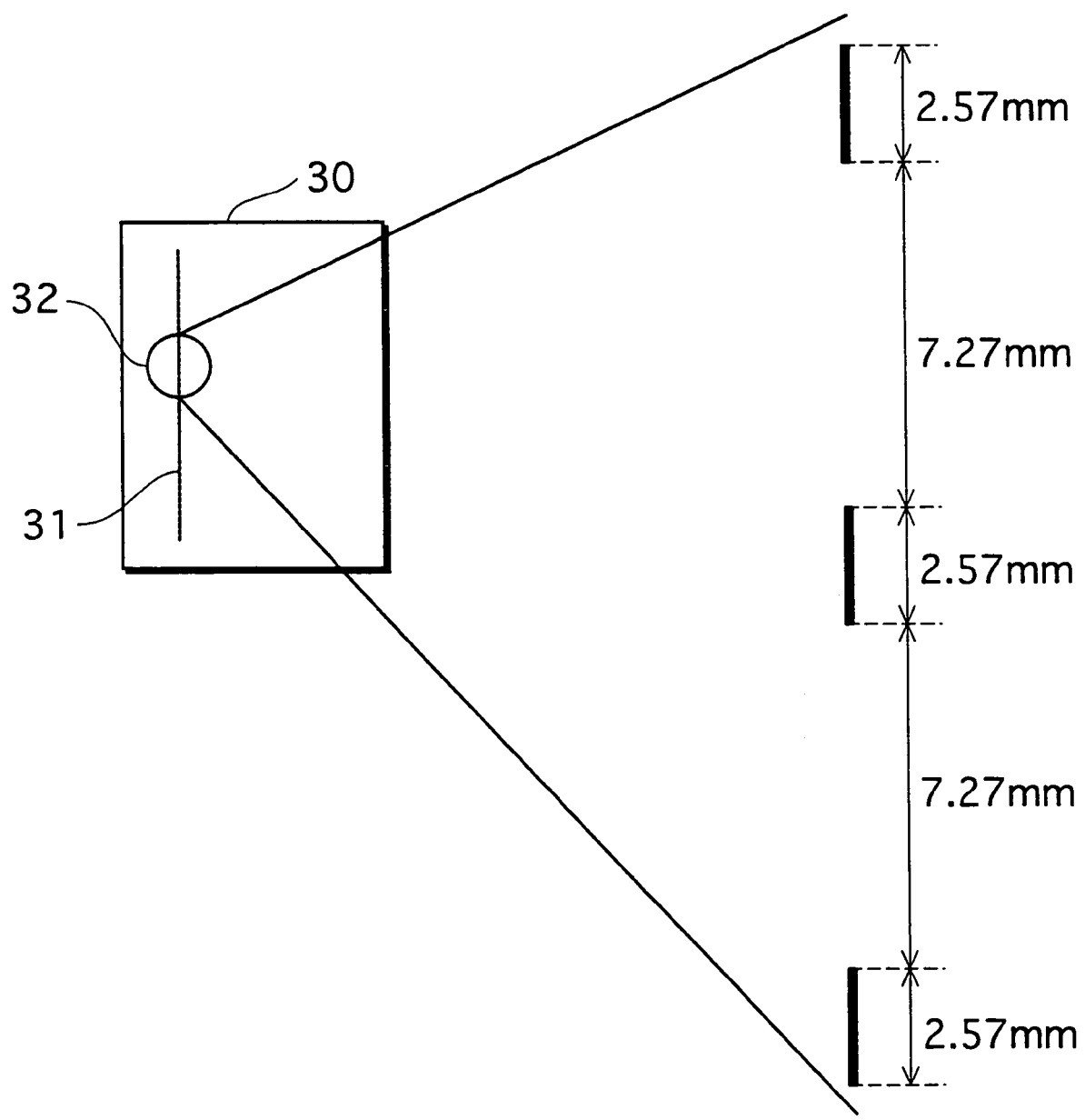
FIG. 6 schematically shows a line-shaped noise that occurs when a foreign object which is 100 µm in diameter adheres to a reading glass 203.

Next is an evaluation of line-shaped noises that occur when a foreign object adheres to the reading glass 203 of the MFP 1. FIG. 6 schematically shows a line-shaped noise that occurs when a foreign object having a diameter of 100 μm adheres to the reading glass 203. In FIG. 6, a line-shaped noise 31 is formed on a recording sheet 30. The broken line shown on the right side of the recording sheet is enlarged figure of the line-shaped noise 31 in a circular area 32 on the recording sheet 30.

When an image is read with a foreign object having a diameter of 100 μm adhering to the reading glass 203, the line-shaped noise 31 occurs as FIG. 6 shows. The length of each individual portion included in the line-shaped noise is 2.57 mm, and the interval between adjacent portions is 7.27 mm. The width of the line-shaped noise is similar to the diameter of the foreign object.

As described above, according to the embodiment, the line-shaped noise becomes less noticeable. Further, compared to the above-described conventional technology vibrating the reading glass at a high frequency not less than 5 kHz, the MFP 1 in the embodiment vibrates the reading glass at 18 Hz, which is a very low frequency. As a result, the undesired sound can be reduced as well.

4. Examination

The following is an examination of a line-shaped noise, which occurs when a foreign object adheres to the surface of the reading glass of a copying machine having a sheet-through type document reader.

(1) A Case of Moving the Reading Glass Only in One Direction

Figure 7A:
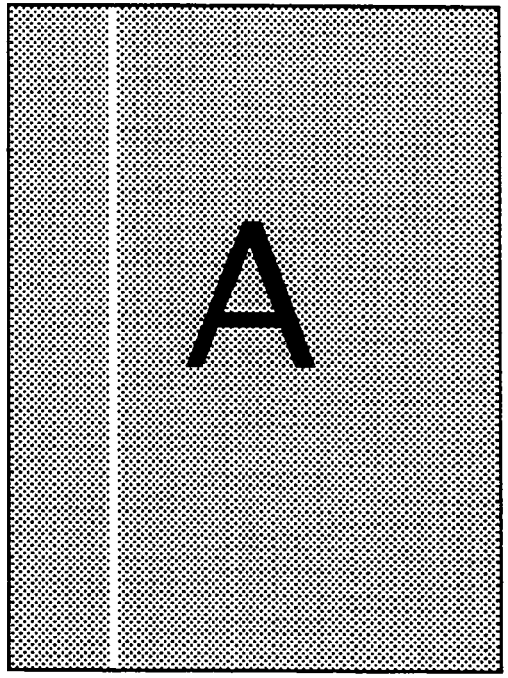
FIG. 7A to 7D are examples showing line-shaped noises that occur when a foreign object adheres to the reading glass.

When an image is read as the reading glass remains stationary, a seamless line-shaped noise occurs on the recording sheet in the direction of the vertical scanning (FIG. 7A).

Figure 7B:
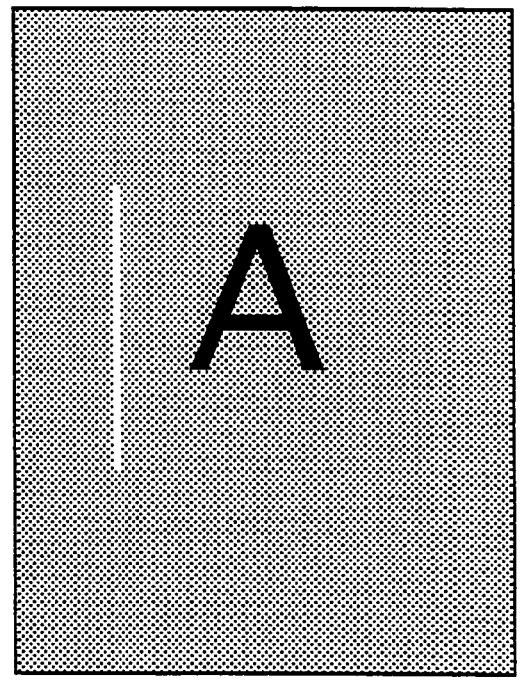

On the contrary, when the reading glass is moved in the feeding direction (the direction of the vertical scanning) during the reading, a line-shaped noise having shorter length occurs. The length depends on how long the foreign object takes to move across the image reading position (FIG. 7B). Therefore, this operation can improve the image quality in a sense that the length of the line-shaped noise can be shortened. However, such a way of shortening the line-shaped noise has limitations.

For instance, in the case of reading a document in Ledger size (432 mm in the direction of the vertical scanning, so-called a "long-size paper") with use of a color CCD (resolution: 600 dpi, linear reading velocity: 177 mm/s, width of reading area 9 dots), and moving the reading glass, on which a foreign object having diameter of 1 mm adheres, at a speed of 50 mm/s in the feeding direction, the size of line-shaped noise becomes approximately 5 mm, which is not very noticeable. However, this is not a realistic solution because the reading glass has to move approximately 122 mm during the reading in this case, and the apparatus needs to be very large for realizing such a movement of the reading glass.

Also, when keeping the moving distance of the reading glass to 10 mm, the moving speed of the reading glass becomes approximately 4 mm/s, and the length of the line-shaped noise caused by the foreign object becomes as long as 60 mm.

Therefore, it is not realistic to shorten the length of the line-shaped noise by moving the reading glass in the feeding direction, because the apparatus has to be large enough to do so. Also, when the moving distance of the reading glass is kept short, the line-shaped noise becomes very long.

Generally, the length of the line-shaped noise $L_{NOISE}$ is expressed as following with a width of a CCD reading area $L_{CCD}$, a CCD linear reading velocity $V_{CCD}$, a moving velocity $V_{GLASS}$ of the reading glass, and the length d of a foreign object adherent to the reading glass in direction of the vertical scanning.

$$L_{NOISE} = \frac{(L_{CCD} + d)}{V_{GLASS}} \times V_{CCD}.$$

Figure 8:
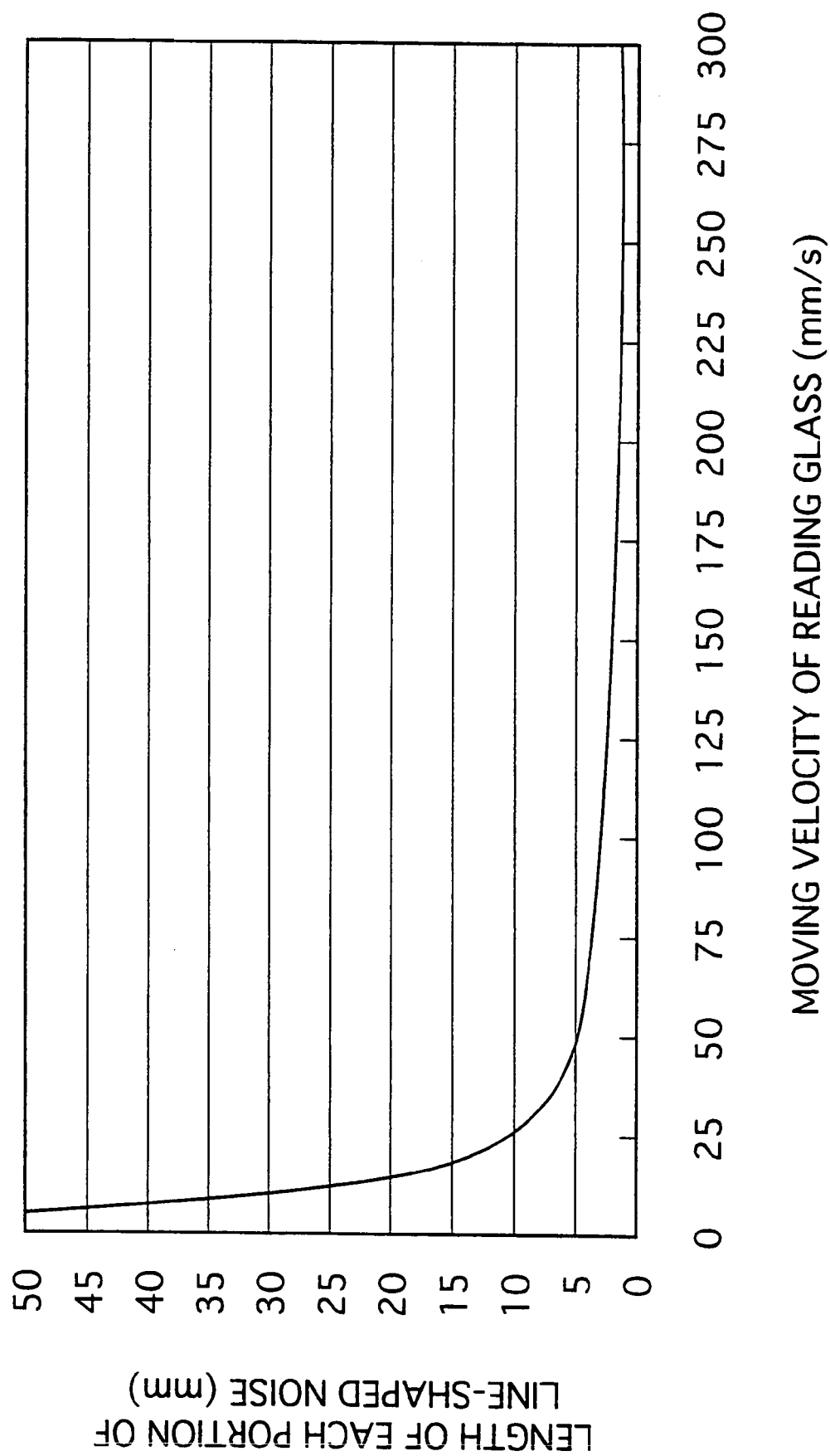
FIG. 8 is a graph showing a relation between a moving velocity $V_{GLASS}$ of a reading glass and the length $L_{NOISE}$ of each individual portion of a line-shaped noise when a CCD linear reading velocity $V_{CCD}$ is 177 mm/s.

FIG. 8 is a graph showing the relation between $V_{GLASS}$ and $L_{NOISE}$ when $V_{CCD}$ is 177 mm/s. This shows that the larger $V_{GLASS}$, the smaller $L_{NOISE}$ becomes.

The following numerical formula represents the relation between $V_{GLASS}$ and a moving distance $L_{GLASS}$ of the reading glass while reading one document.

$$L_{GLASS} = \frac{L_{DOCUMENT}}{V_{CCD}} \times V_{GLASS}.$$

Figure 9:
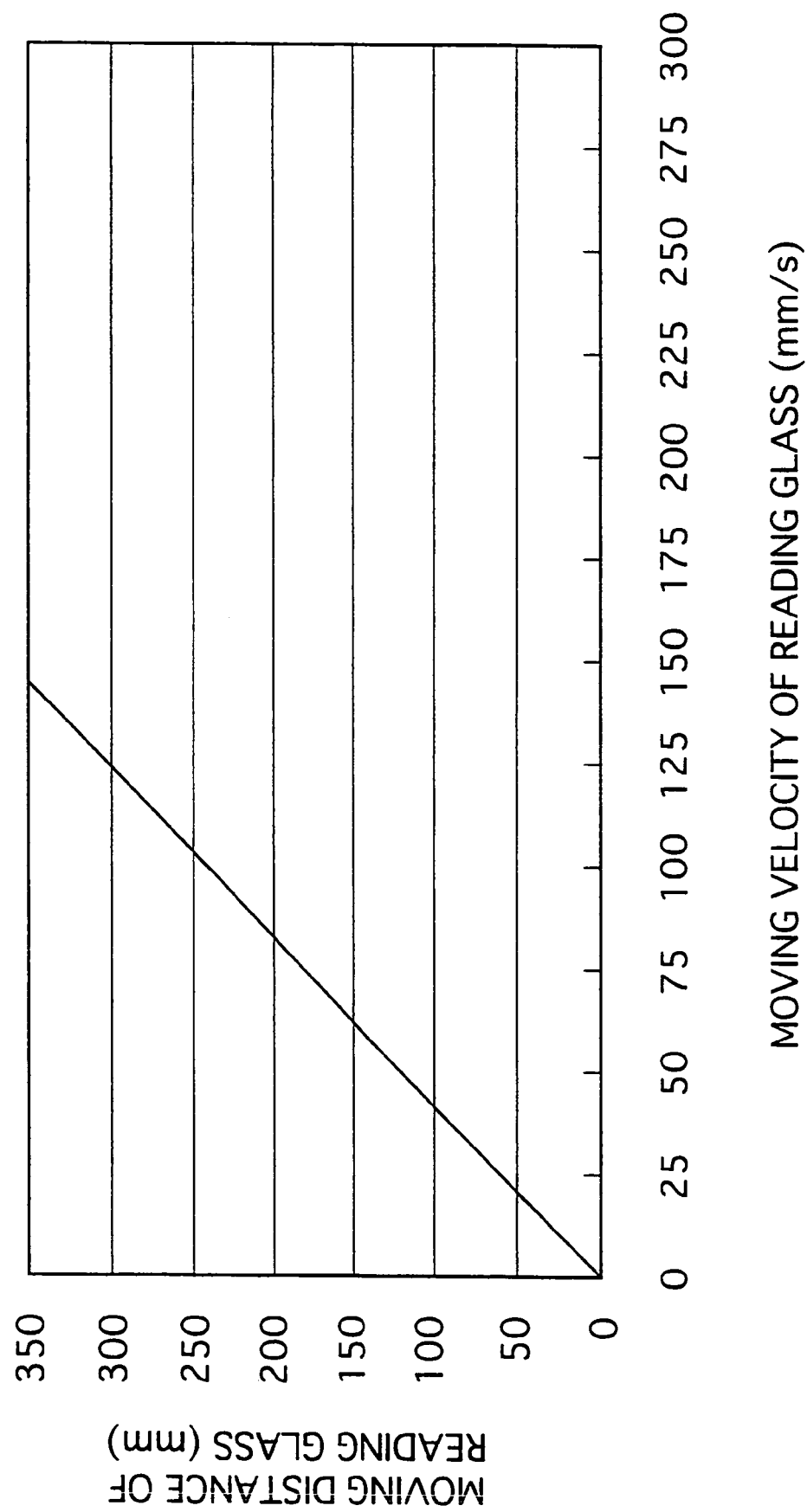
FIG. 9 is a graph showing a relation between a moving velocity $V_{GLASS}$ of a reading glass and a moving distance $L_{GLASS}$ of a reading glass while reading one document.

FIG. 9 is a graph showing the relation between "$V_{GLASS}$" and "$L_{GLASS}$". This shows that the larger "$V_{GLASS}$", the larger "$L_{GLASS}$" becomes.

(2) A Case of Reciprocating the Reading Glass

Figure 7C:
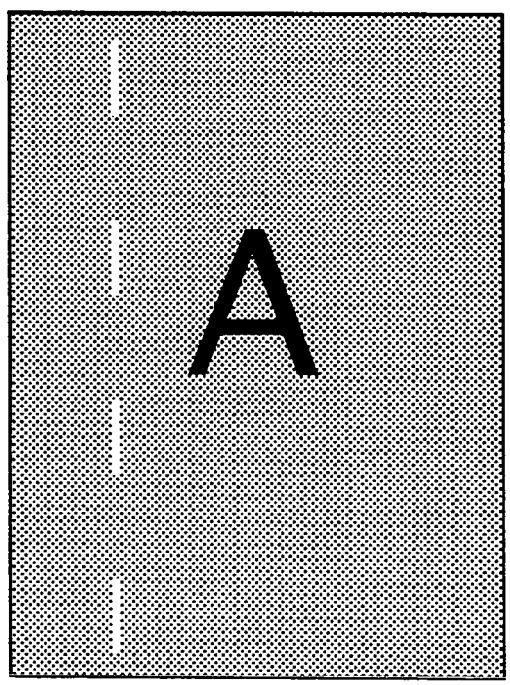

The following is an examination of a case of reciprocating the reading glass. For instance, when the frequency of the reciprocating motion is not less than 10 Hz, the moving velocity of the reading glass and the feeding velocity becomes the same, and the line-shaped noise becomes short even when the moving distance of the reading glass is 3 mm. However, the line-shaped noise becomes long at the turning point because the moving velocity of the reading glass is zero at the point. Therefore, the line-shaped noise occurs intermittently (FIG. 7C) in this case. Compared to the case where the reading glass is moved only in one direction, the length of individual portions of the noise line is shorter in this case. However, the noise is still unseemly.

Figure 7D:
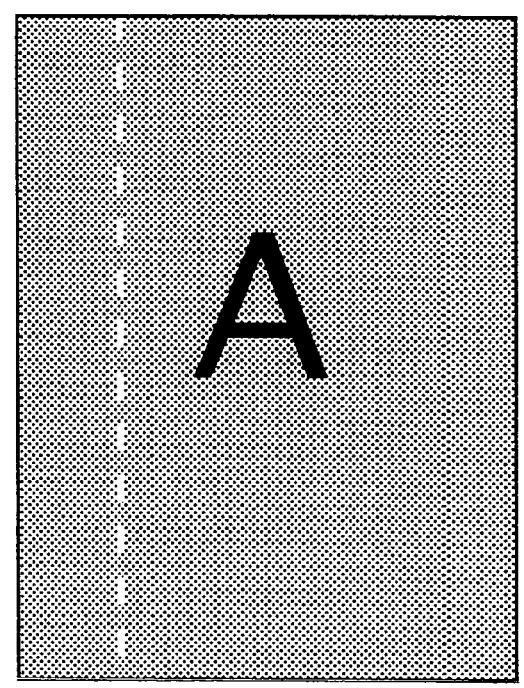

On the contrary, when the frequency of the reciprocating motion is 50 Hz, the length of individual portions of the line-shaped noise becomes even shorter (FIG. 7D). However, the interval between adjacent portions of the line-shaped noise becomes shorter as well. Therefore, the noise is unseemly again.

(3) Subjective Evaluation of the Line-Shaped Noise (Part I)

When the reading glass is reciprocated, the moving velocity of the reading glass becomes zero at both ends of the reciprocating motion (these ends are hereinafter called "dead points").

When the moving reading glass is at a position other reading area of the CCD for a long time and therefore the length of the line-shaped noise becomes short, because the velocity of the reading glass is large. When the line-shaped noise is not more than 1 mm, it becomes not very noticeable by image processing, such as error diffusion. This is because the density difference between the line-shaped noise and the image around the line-shaped noise is small.

On the contrary, when the moving reading glass is in the vicinities of the dead points, the foreign object remains in the reading area of the CCD for a long time and the line-shaped noise becomes long. This is because the velocity of the reading glass is small in the vicinities of the dead points. The length of the line-shaped noise is longest when the foreign object changes the moving direction just before crossing all the CCDs corresponding to RGB respectively. Therefore, the line-shaped noise becomes less noticeable as a whole by making the line-shaped noise less noticeable at that time.

The length of the line-shaped noise is longest when the foreign object changes the moving direction at the ends of the reading area of the CCDs for the three colors. In this case, when the average velocity of the reading glass while the foreign object reciprocates within the reading area of the CCDs is $V_{MEAN1}$, a time $T_D$ taken by the foreign object to move forward and backward once is given by:

$$T_D = \frac{2(L_{CCD} + d)}{V_{MEAN1}}.$$

In contrast to that the width of the CCD reading area $L_{CCD}$ is 9 dots (=387 μm), the size of the foreign object is usually only a few μm and can be disregarded. Therefore, $T_D$ is now given $$T_D = \frac{2L_{CCD}}{V_{MEAN1}}.$$

The longest length $L_{MAX}$ of the line-shaped noise is:

$$L_{MAX} = V_{CCD} \times \frac{2L_{CCD}}{V_{MEAN1}}.$$

Also, when the stroke length of the reciprocating motion of the reading glass is $L_{STROKE}$ and the average moving velocity of the reading glass is $V_{MEAN2}$, the cycle of the line-shaped noise "$P_{NOISE}$", which means the distance between start points of adjacent portions included in a line-shaped noise, is given by $$P_{NOISE} = \frac{V_{CCD} \times 2L_{STROKE}}{V_{MEAN2}}.$$

Therefore, to make the line-shaped noise less noticeable, it is preferable to make $L_{MAX}$ smaller. $L_{MAX}$ is given by $$L_{MAX} \cong \frac{V_{CCD} \times 2L_{CCD}}{V_{MEAN1}}.$$

At the same time, it is preferable to make the ratio of $L_{MAX}$ to $P_{NOISE}$ smaller. The ratio is given by $$\frac{L_{MAX}}{P_{NOISE}} = \frac{(L_{CCD} + d) \times V_{MEAN2}}{L_{STROKE} \times V_{MEAN1}} \cong \frac{L_{CCD} \times V_{MEAN2}}{L_{STROKE} \times V_{MEAN1}}.$$

The relation between the average velocity of the reading glass $V_{MEAN2}$ and the maximum velocity of the reading glass $V_{MAX}$, and the relation between the average velocity of the reading glass $V_{MEAN1}$ and the maximum velocity of the reading glass $V_{MAX}$ are respectively given by $$V_{MEAN2} \cong \frac{V_{MAX}}{\sqrt{2}}, \text{ and } V_{MEAN1} \cong V_{MAX}\sqrt{\frac{L_{CCD}}{2L_{STROKE}}}.$$

Therefore, the above-described ratio is given by $$\frac{L_{MAX}}{P_{NOISE}} \cong \left(\frac{L_{CCD} + d}{L_{STROKE}}\right) \times \sqrt{\frac{L_{STROKE}}{L_{CCD}}} \cong \sqrt{\frac{L_{CCD}}{L_{STROKE}}}.$$

This means that the line-shaped noise becomes less noticeable when $L_{STROKE}$ is large enough compared to $L_{CCD}$.

To evaluate the noticeability, we presented several line-shaped noises to a hundred of examinees. The line-shaped noises had been produced by changing the value of $L_{STROKE}$ with the value of $L_{CCD}$ fixed to 9 dots. Note that the frequency of the reciprocating motion of the reading glass had been 10 Hz.

Figure 10:
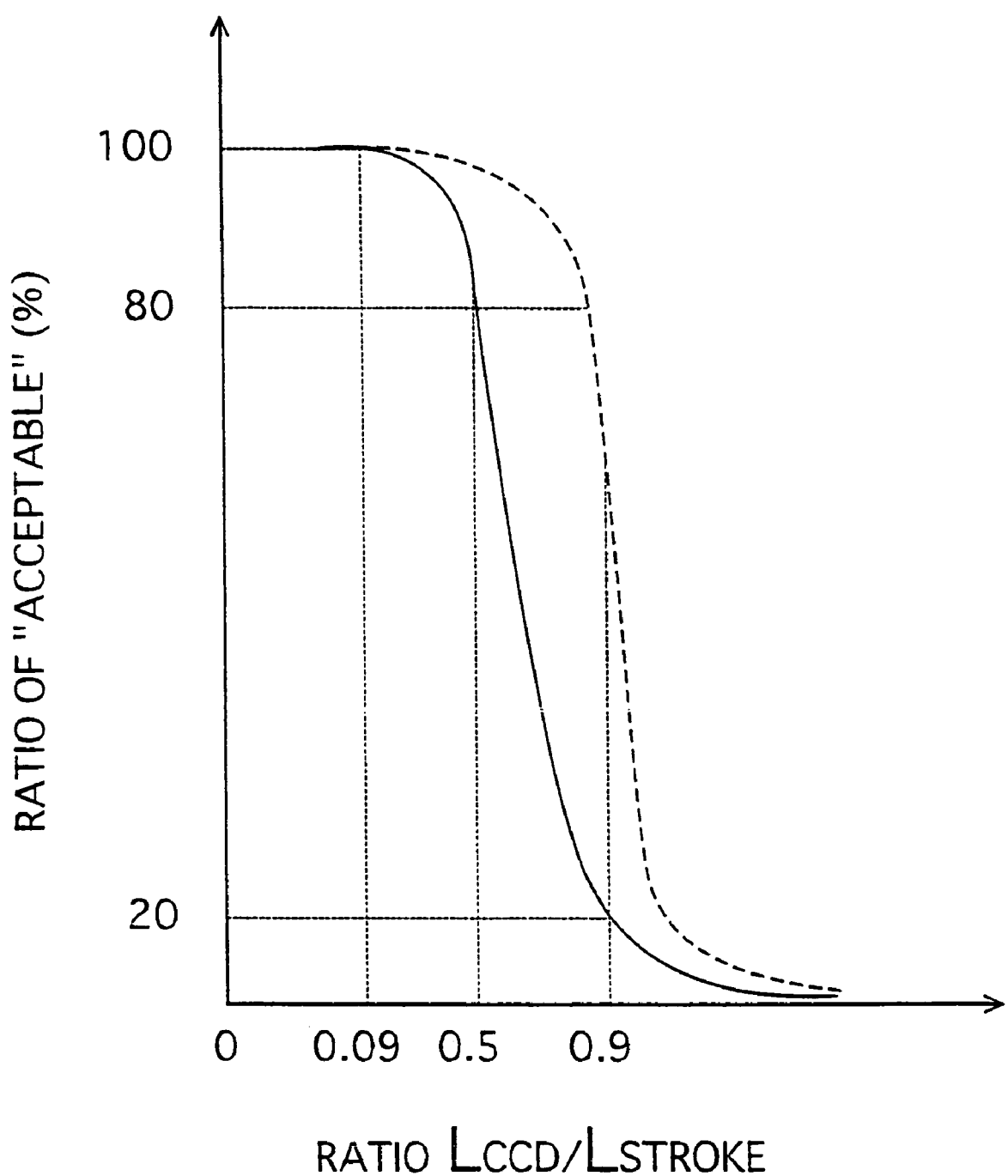
FIG. 10 is a graph showing a result of an evaluation in which examinees were presented with line-shaped noises that had been produced by changing a stroke length of a reciprocating motion of a reading glass $L_{STROKE}$ with a width of CCD reading area $L_{CCD}$ fixed, to evaluate the noticeability of the line-shaped noises.

FIG. 10 is a graph showing the result of the evaluation. In FIG. 10, the horizontal axis represents $L_{CCD}/L_{STROKE}$, which is the ratio of $L_{CCD}$ to $L_{STROKE}$. The vertical axis represents the ratio of the examinees who answered that the presented line-shaped noise was acceptable, namely the ratio of the examinees who answered the line-shaped noise was not noticeable. The solid line represents the result at a time when the line-shaped noise is of a high-density foreign object, and the broken line represents the result at a time when the lines noise is of a low-density foreign object.

The adhesion state of the foreign object to the recording sheet is quantified as reflection density measured by the Macbeth illuminometer (Macbeth reflection density).

The Macbeth reflection density OD is defined as following with use of the value of luminous energy (reflectance R) reflected from a sample receiving reference luminous energy:

$OD = -\log R.$

This means that the higher the Macbeth reflection density OD, the lower the reflectance R is and the blacker the sample becomes.

Generally, the foreign object having the lowest Macbeth reflection density OD is a paper dust (a filler, such as calcium carbonate), and its density is approximately 0.3. The foreign object having the highest Macbeth reflection density OD is a toner and a lead of a pencil, and their densities are approximately 1.4. In view of this knowledge, the evaluation was performed in cases where the Macbeth reflection density OD is 0.3 (low-density foreign object) and where the OD is 1.4 (high-density foreign object).

As FIG. 10 shows, in both cases of the high-density foreign object (the solid line) and the low-density foreign object (the broken line), the ratio of the examinees who answered that the presented line-shaped noise was acceptable decreases as the ratio $L_{CCD}/L_{STROKE}$ increases. Also, $L_{CCD}/L_{STROKE}$ becomes large when the density of the foreign object is low.

More than 80% of the examinees answered that the line-shaped noise was acceptable when the value of $L_{CCD}/L_{STROKE}$ is equal to or less than 0.5 in the case of the high-density foreign object, and when the value of $L_{CCD}/L_{STROKE}$ is equal to or less than 0.9 in the case of the low-density foreign object. In both cases, the 100% of the examinees answered that the line-shaped noise was acceptable when $L_{CCD}/L_{STROKE}$ is not more than 0.09. When assuming that not less than 95% of examinees should be satisfied, $L_{CCD}/L_{STROKE}$ should be not more than 0.3 in both cases.

(4) Relation Between Average Velocity and Maximum Velocity of Reading Glass

The following is a description of how to obtain the relational expressions showing the relation between the average velocities of the reading glass $V_{MEAN1}$ and the maximum velocity of the reading glass $V_{MAX}$, and the relation between the average velocities of the reading glass $V_{MEAN2}$ and the maximum velocity of the reading glass $V_{MAX}$, which are respectively given by $$V_{MEAN2} \cong \frac{V_{MAX}}{\sqrt{2}}, \text{ and } V_{MEAN1} \cong V_{MAX}\sqrt{\frac{L_{CCD}}{2L_{STROKE}}}.$$

Here, the velocity of the reading glass changes in a cycle $T_{GLASS}$ according to a sine wave. Therefore, $$V_{MAX} \times \sin\frac{2\pi}{T_{GLASS}}t$$

Firstly, the relational expression for the $V_{MEAN2}$ and $V_{MAX}$ is obtained as follows. By defining $V_{MEAN2}$ as a root-mean-square of the moving velocity of the reading glass, it is easy to obtain the relational expression with use of the double angle formulas of trigonometric functions.

$$V_{MEAN2} \equiv \left(\frac{1}{T}\int_0^T \left(V_{max}\sin\left(\frac{2\pi}{T}t\right)\right)^2 dt\right)^{1/2} = \frac{V_{max}}{\sqrt{2}}$$

To obtain the relational expression for the average velocity $V_{MEAN1}$ and the maximum velocity $V_{MAX}$ of the reading glass, the value of $V_L$ of the reading glass is required. $V_L$ is the maximum velocity of the reading glass while the foreign object moves within the CCD reading area of the CCDs for three colors. The velocity of the reading glass becomes $V_L$ when the foreign object moves outside of the CCD reading area, and then reaches at the maximum velocity $V_{MAX}$. In the case where the period between the time when the foreign object passes through the dead point and the time when its velocity reaches at $V_L$ is T1 and the period between T1 and the time when the velocity becomes the $V_{MAX}$ is T2, $V_L : V_{MAX} \cong T1 : T2.$ The distance between the dead point and the position where the velocity becomes $V_L$ is equal to $L_{CCD}$, and the distance between the dead point and the position where the velocity becomes $V_{MAX}$ is equal to a half of $L_{STROKE}$. Therefore, $$V_L \times \frac{T1}{2} \cong L_{CCD}$$
$$V_{MAX} \times \frac{T2}{2} \cong \frac{L_{STROKE}}{2}.$$

As a result, $$V_L \cong V_{MAX} \sqrt{\frac{2L_{CCD}}{L_{STROKE}}}.$$

Further, $V_{MEAN1}$ can be approximated as follows:

$$V_{MEAN1} \cong \frac{V_L}{2}.$$

Therefore, the relation between $V_{MEAN1}$ and $V_{MAX}$ is given by $$V_{MEAN1} \cong V_{MAX} \sqrt{\frac{L_{CCD}}{2L_{STROKE}}}.$$

(5) Subjective Evaluation of the Line-Shaped Noise (Part II)

Figure 11:
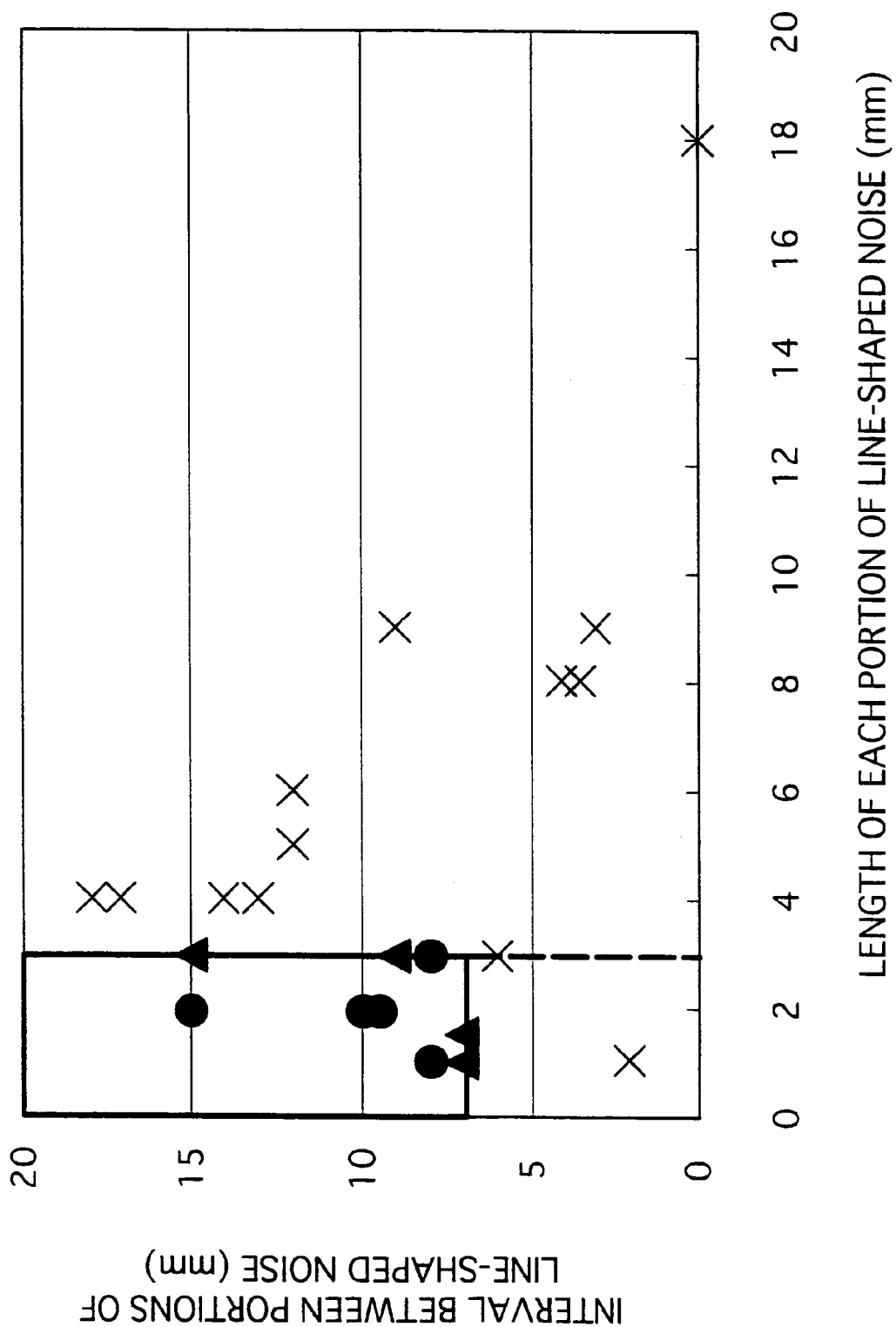
FIG. 11 is a scatter diagram showing a result of an evaluation in which examinees were presented with several line-shaped noises having different lengths and intervals, to evaluate the noticeability of the line-shaped noises.

To evaluate the impression of the line-shaped noise, we presented several line-shaped noises having different lengths and intervals to examinees. FIG. 11 is a scatter diagram showing the evaluation result. In FIG. 11, a sign ● represents a combination of the length and the interval which was regarded as not being noticeable at all. A sign ▲ represents the combination which was regarded as not being noticeable very much. A sign X represents the combination which was regarded as being noticeable. As FIG. 11 shows, the examinees regarded the line-shaped noise as not being noticeable at all when the length of each portion of line-shaped noises is not more than 3 mm and the interval between portions is not less than 7 mm. This condition corresponds to a case where the ratio of the width of the CCD reading area $L_{CCD}$ to the stroke $L_{STROKE}$ is 0.09, and this matches the above-described experimental result.

(6) Moving Condition of Reading Glass

Next is a description of a moving condition of reading glass for satisfying that the length of the line-shaped noise becomes not more than 3 mm and the interval becomes not less than 7 mm.

When the CCD linear reading velocity is $S_P$ and the frequency of the reciprocating motion of the reading glass is f, the cycle of the line-shaped noise $P_{NOISE}$ is given by $$P_{NOISE} = \frac{S_P}{f}.$$

With use of this formula and the ratio of the maximum length of the line-shaped noise $L_{MAX}$ to the cycle of the line-shaped noise $P_{NOISE}$, the length $L_{MAX}$ is give by $$L_{MAX} = \frac{S_P}{f} \times \frac{L_{CCD} + d}{L_{STROKE}} \times \sqrt{\frac{L_{STROKE}}{L_{CCD}}}.$$

When $L_{MAX}$ is not more than 3 mm, $$\frac{S_P}{f} \times \frac{L_{CCD} + d}{L_{STROKE}} \times \sqrt{\frac{L_{STROKE}}{L_{CCD}}} \leq 3.$$

Therefore, the following has to be true:

$$L_{STROKE} \geq \frac{(S_P(L_{CCD} + d))^2}{9f^2 L_{CCD}} \tag{1}$$

For instance, when $S_P$=177 mm/s, $L_{CCD}$=387 μm, and d=100 μm.

$$L_{STROKE} \geq \frac{2133.2}{f^2}. \tag{2}$$

Also, when the interval of portions of the line-shaped noise is not less than 7 mm, the difference between $P_{NOISE}$ and $L_{MAX}$ has to be not less than 7 mm.

$$P_{NOISE} - L_{MAX} \geq 7.$$

Here, $$\left(1 - \frac{L_{CCD} + d}{L_{STROKE}} \times \sqrt{\frac{L_{STROKE}}{L_{CCD}}}\right) \times \frac{S_P}{f} \geq 7.$$

Therefore, the following has to be true:

$$L_{STROKE} \geq \left(\frac{1}{1 - \frac{7f}{S_P}} \times \frac{L_{CCD} + d}{\sqrt{L_{CCD}}}\right)^2. \tag{3}$$

In the same way, when $S_P$=177 mm/s, $L_{CCD}$=387 μm, d=100 μm, $$L_{STROKE} \geq \left(\frac{0.7828}{1 - 0.04f}\right)^2. \tag{4}$$

Figure 12:
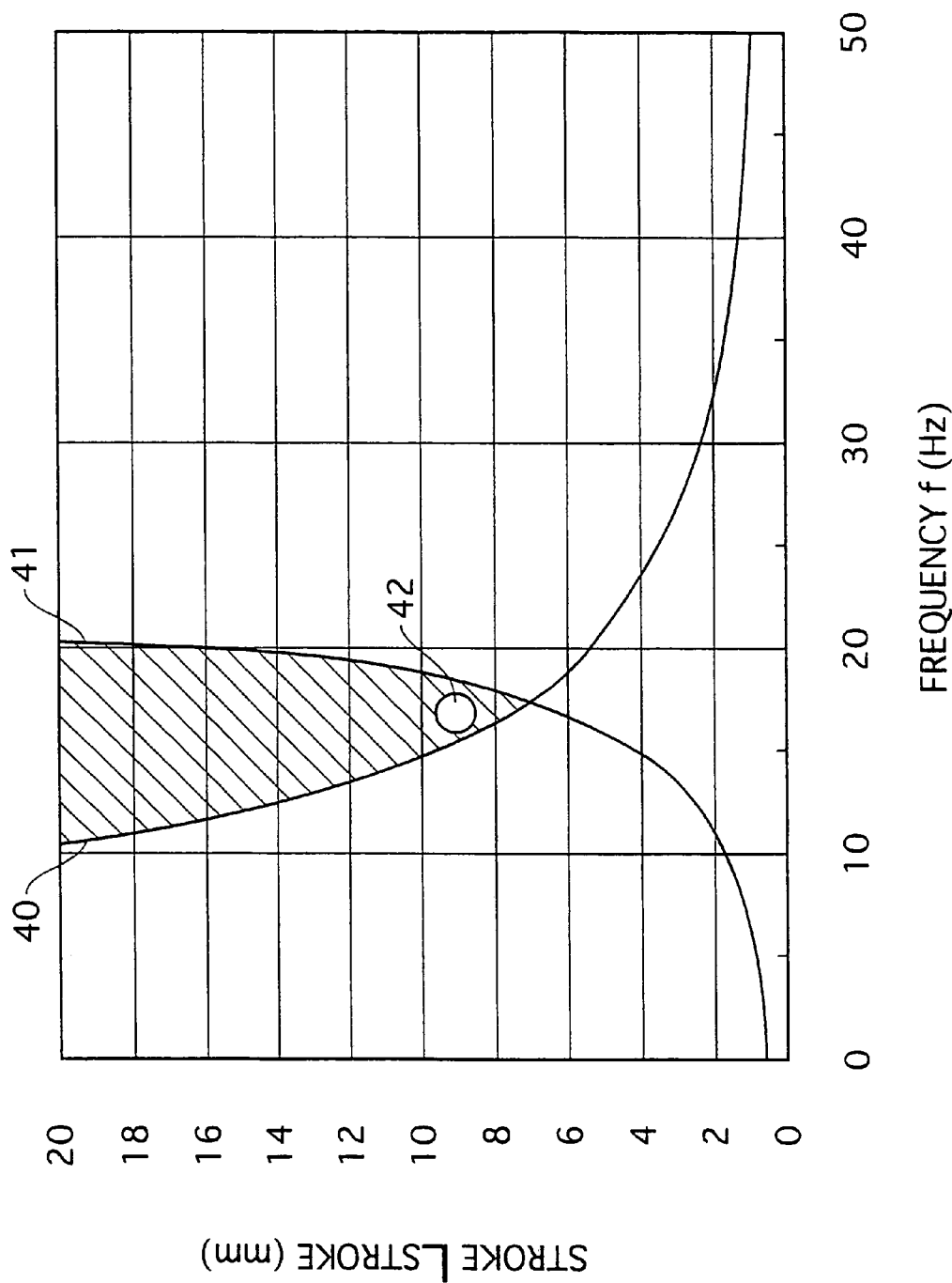
FIG. 12 shows $L_{STROKE}$ corresponding to a frequency f in a case where the length of a line-shaped noise is less than 3 mm and the interval of individual portions of the line-shaped noise is more than 7 mm.

FIG. 12 shows $L_{STROKE}$ corresponding to the frequency f in a case where the length of the line-shaped noise is less than 3 mm, and the interval of portions of the line-shaped noise is more than 7 mm. In FIG. 12, the horizontal axis represents the frequency f at which the reading glass reciprocates, and the vertical axis represents the stroke $L_{STROKE}$ at which the reading glass reciprocates. A curved line 40 is a graph formed by plotting the formula (2), and a curved line 41 is a graph formed by plotting the formula (4).

In FIG. 12, the area between the curved lines 40 and 41 (the shaded area) shows combinations of f and $L_{STROKE}$, with which the length of the line-shaped noise becomes not more than 3 mm, and the interval of the portions of the line-shaped noise becomes not less than 7 mm. A sign ○ is a point at which the frequency f is 18 Hz and the stroke $L_{STROKE}$ is 9 mm. In this case, with use of the formulas (2) and (4), the maximum length of the line-shaped noise $L_{MAX}$ and the interval I are:

$L_{MAX}$=2.57 (mm)

I=7.27 (mm).

When the document reader has the above-described structure, it is possible to keep the frequency f low and $L_{STROKE}$ small for making the line-shaped noise less noticeable. This means that the apparatus can be kept silent by weakening the vibration, and the apparatus can be small as well.

Modificaions

The present invention is described above in accordance with the embodiment. However, as matter of course, the present invention is not limited to this. The followings are possible modifications.

(1) In the above-described embodiment, the frequency of the reciprocating motion of the reading glass is 18 Hz and the stroke is 9 mm. However, as the matter of course, the present invention is not limited to this. Also, although the case where the CCD liner velocity for reading is 177 mm/s and the width of the CCD reading area is 9 dots is exclusively described above, the present invention is not limited to this. When CCD linear reading velocity $S_P$, the frequency of the reciprocating motion of the reading glass f, the length of the stroke of the reciprocating motion $L_{STROKE}$, and the length d of the foreign object in the direction of the vertical scanning adherent to the reading glass satisfy the formulas (1) and (3), the length of the line-shaped noise is not more than 3 mm and the interval is not less than 7 mm. This can make the line-shaped noise less noticeable.

Figure 13:
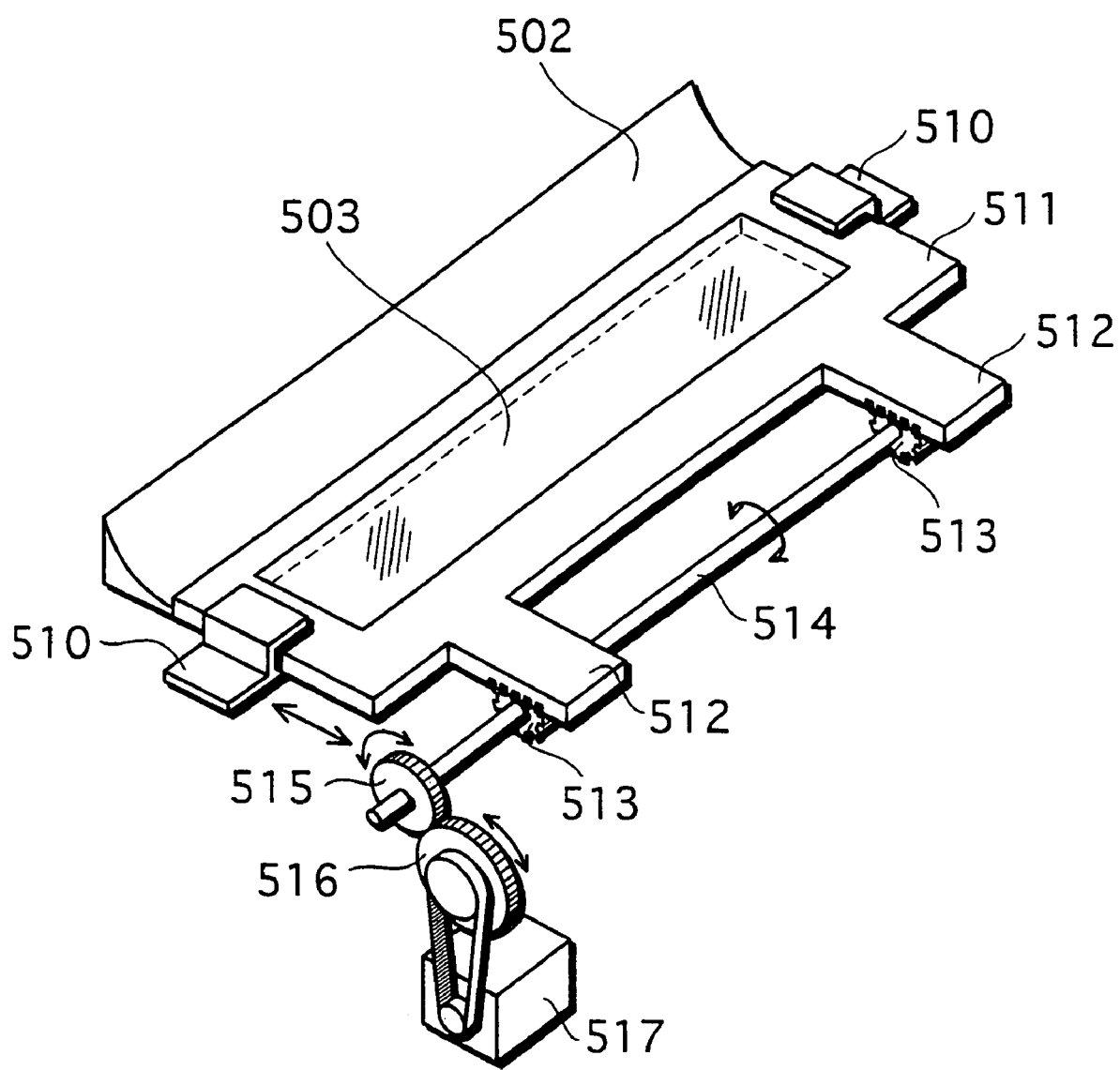
FIG. 13 schematically shows the structure of a document reading unit pertaining to a modification (2) of the present invention, by which the document reading unit reciprocates the reading glass.

(2) In the above-described embodiment, the reading glass is driven by a crank mechanism. However, the present invention is not limited to this, and other mechanisms may be used. For instance, the rack-and-pinion steering may be used. FIG. 13 schematically shows the structure of the document reading unit pertaining to this modification for reciprocating the reading glass.

As FIG. 13 shows, the document reading unit 500 includes a paper guide 502, a reading glass 503, glass holder guide 510, a reading glass holder 511, a rack 512, a pinion 513, a shaft 514, gears 515 and 516, and a motor 517.

The reading glass 503 is supported by the reading glass holder 511, and the reading glass holder 511 is regulated by the glass holder guide 510 so as to reciprocate in the direction of the vertical scanning. Also, the rack 512 is attached to the reading glass 511 on the other side of the paper guide 502.

Gear teeth are formed on a main surface of the rack 512, and those are engaged with pinion 513.

A gear 515 is attached to one end of the shaft 514, which rotatively drives the pinion 513. The gear 516 meshes with the gear 515, and has a band wheel using the same axis as the gear 516. The motor 517 has a band wheel as well, and a band is attached around band wheels of the motor 517 and the gear 516. As the motor 517 rotates its band wheel, the band wheel of the gear 516 is driven rotatively. This rotates the gear 516, and then rotates the gear 515. The pinion 513 and the rack 512 convert this rotary motion to a linear motion, and accordingly the reading glass holder 511 reciprocates in the direction of the vertical scanning.

The reading glass 503 can be reciprocated at a desired frequency and a stroke with use of such a rack-and-pinion mechanism.

(3) In the above-described embodiment, the moving velocity of the reading glass varies in accordance with the sine wave. However, as matter of course, the present invention is not limited to this. The moving velocity of the reading glass may vary in accordance with a pattern other than the sine wave.

As described above, the line-shaped noise becomes longest when the foreign object adhering to the reading glass enters the CCD reading area from one end of the CCD reading area, and turns at the other end of the area. When the moving velocity of the reading glass is based on the sine wave, the moving velocity becomes low when the reading glass is in the vicinity of the dead point. During this period, the line-shaped noise becomes very long. On the contrary, as heighten the moving velocity when the reading glass is in the vicinity of the dead point, the maximum length of the line-shaped noise can be shorten and the line-shaped noise can be made less noticeable.

To realize this, the reading glass may be reciprocated at a uniform velocity with use of the rack-and-pinion mechanism described in the modification (2). Note that if the reading glass is stopped at the dead point abruptly, it can cause a vibration and undesired sound, and possibly damages the document reader. Therefore, when the reading glass moves at a uniform velocity, it is preferable that the moving velocity of the reading glass is as low as possible within a range the formulas (1) and (3) are satisfied.

(4) In the above-described embodiment, the document is read via the reading glass. However, as a matter of course, the present invention is not limited to this. A document may be read via a transparent member made of other than glass. For instance, PC (polycarbonate), PMMA (polymethyl-methacrylate), and transparent ABS (acrylonitrile butadiene styrene) may be used.

(5) In the above-described embodiment, a CCD is used for reading an image on a document. However, as a matter of course, the present invention is not limited to this, and a document may be read with use of a device other than the CCD. For instance, a CIS (contact image sensor) may be used.

Although the present invention has been fully described by way of examples with reference to the accompanying drawings it is to be noted that various changes and modifications will be apparent to those skilled in the art. Therefore, unless such changes and modifications depart from the scope of the present invention, they should be construed as being included therein.

What is claimed is:

1. A document reader that reads a color image of a document via a transparent member while feeding the document, comprising:

a plurality of reading units disposed in a feeding direction of the document; and a driving unit operable to reciprocate the transparent member in the feeding direction over the reading units, wherein, when a stroke length of the reciprocating motion of the transparent member is S, and a width in the feeding direction of a reading area of the reading units is W, $$\frac{W}{S} \leq 0.9.$$

2. The document reader of claim 1, wherein $$\frac{W}{S} \leq 0.3.$$

3. The document reader of claim 1, wherein a velocity of the reciprocating motion varies according to a sine wave.

4. The document reader of claim 1, wherein
when a linear reading velocity of each reading unit is V, the width of the reading area is W, a frequency of the reciprocating motion is f, a length in the feeding direction of a foreign object adherent to the transparent member is d, and the stroke length of the reciprocating motion is S, $$S \geq \frac{(V(W+d))^2}{9f^2 W}, \quad \text{and} \quad S \geq \left( \frac{1}{1 - \frac{7f}{V}} \times \frac{W+d}{\sqrt{W}} \right)^2.$$

5. The document reader of claim 1, wherein
when a linear reading velocity of each reading unit is V, the width of the reading area is W, a frequency of the reciprocating motion is f, and the stroke length of the reciprocating motion is S, $$S \geq \frac{V^2 W}{9f^2}, \quad \text{and} \quad S \geq \left( \frac{1}{1 - \frac{7f}{V}} \times \sqrt{W} \right)^2.$$

6. The document reader of claim 1, wherein
a linear reading velocity of each reading unit is 177 mm/s, the width of the reading area is 387 μm, a frequency of the reciprocating motion is 18 Hz, and the stroke length is 9 mm.

7. The document reader of claim 1, wherein
the reading units are three CCD line sensors, which are disposed so that longitudinal directions of the CCD line sensors respectively corresponding to three primary colors are substantially orthogonal to the feeding direction.

8. An image forming apparatus, comprising
a document reader including:
a feeding unit operable to feed a document;
a transparent member;
a plurality of reading units disposed in a feeding direction of the document and operable to read a color image of the document via the transparent member; and
a driving unit operable to reciprocate the transparent member in the feeding direction over the reading units,
wherein, when a stroke length of the reciprocating motion of the transparent member is S, and a width in the feeding direction of a reading area of the reading units is W, $$\frac{W}{S} \leq 0.9.$$

9. A document reading method performed by a document reader including a transparent member and a plurality of reading units that read a color image of a document via the transparent member, the reading units being disposed in a feeding direction of the document, the document reading method comprising:
a feeding step of feeding the document; and
a driving step of driving reciprocating the transparent member in the feeding direction over the reading units,
wherein, when a stroke length of the reciprocating motion of the transparent member is S, and a width in the feeding direction of a reading area of the reading units is W, $$\frac{W}{S} \leq 0.9.$$

10. The document reader of claim 1, wherein to obscure degradation of image quality due to a high-density foreign object, $$\frac{W}{S} \leq 0.5.$$

11. The image forming apparatus of claim 8, wherein to obscure degradation of image quality due to a high-density foreign object, $$\frac{W}{S} \leq 0.5.$$

12. The image forming apparatus of claim 8, wherein $$\frac{W}{S} \leq 0.3.$$

13. The document reading method of claim 9, wherein to obscure degradation of image quality due to a high-density foreign object, $$\frac{W}{S} \leq 0.5.$$

14. The document reading method of claim 9, wherein $$\frac{W}{S} \leq 0.3.$$

* * * * *